(12) United States Patent
Lee et al.

(10) Patent No.: US 9,957,418 B2
(45) Date of Patent: May 1, 2018

(54) COMPOSITION FOR FORMING SILICA LAYER, METHOD FOR MANUFACTURING SILICA LAYER, AND SILICA LAYER

(71) Applicant: SAMSUNG SDI CO., LTD., Yongin-si, Gyeonggi-do (KR)

(72) Inventors: Eun-Seon Lee, Suwon-si (KR);
Woo-Han Kim, Suwon-si (KR);
Hui-Chan Yun, Suwon-si (KR);
Jin-Hee Bae, Suwon-si (KR);
Byeong-Gyu Hwang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days. days.

(21) Appl. No.: 14/967,102

(22) Filed: Dec. 11, 2015

(65) Prior Publication Data
US 2016/0333222 A1 Nov. 17, 2016

(30) Foreign Application Priority Data

May 15, 2015 (KR) .................. 10-2015-0068120

(51) Int. Cl.
*H01L 21/02* (2006.01)
*C09D 183/16* (2006.01)
*H01B 3/46* (2006.01)
*C08G 77/62* (2006.01)

(52) U.S. Cl.
CPC ............ *C09D 183/16* (2013.01); *H01B 3/46* (2013.01); *C08G 77/62* (2013.01)

(58) Field of Classification Search
CPC .................. C08G 77/62; B32B 9/045
See application file for complete search history.

(56) References Cited

U.S. PATENT DOCUMENTS 3,445,418 A * 5/1969 Gibbon ............... C08L 83/04
524/773
2011/0129981 A1* 6/2011 Lim .................. H01L 21/02216
438/381

FOREIGN PATENT DOCUMENTS

| CN | 104513613 A | 4/2015 |
|----|-------------|--------|
| JP | 2008-088224 A | 4/2008 |
| KR | 10-2011-0023411 A | 3/2011 |
| KR | 10-2011-0062158 A | 6/2011 |
| KR | 10-1056838 B1 | 8/2011 |
| KR | 10-1131640 | 3/2012 |
| KR | 10-2012-0083902 A | 7/2012 |
| KR | 10-1243339 B1 | 3/2013 |
| KR | 10-2014-0024342 A | 2/2014 |
| KR | 10-1412453 B1 | 6/2014 |
| KR | 10-2015-0039084 A | 4/2015 |

OTHER PUBLICATIONS

KR 10 10568380000 B1 machine translation (2011).*
Chinese Search Report from the SIPO Office Action dated Nov. 13, 2017, for corresponding Chinese Patent Application No. 201510940597.2 (2 pages).
KIPO Office Action dated Sep. 14, 2017, for corresponding Korean Patent Application No. 10-2015-0068120 (5 pages).

* cited by examiner

*Primary Examiner* — Kuo Liang Peng
(74) *Attorney, Agent, or Firm* — Lewis Roca Rothgerber Christie LLP

(57) ABSTRACT

A composition for forming a silica layer includes a silicon-containing polymer and a solvent, wherein the silicon-containing polymer has a total sum of Si—H integral values in a $^1$H-NMR spectrum of less than or equal to about 12. The sum of the Si—H integral values is calculated under conditions described in the specification.

17 Claims, 1 Drawing Sheet

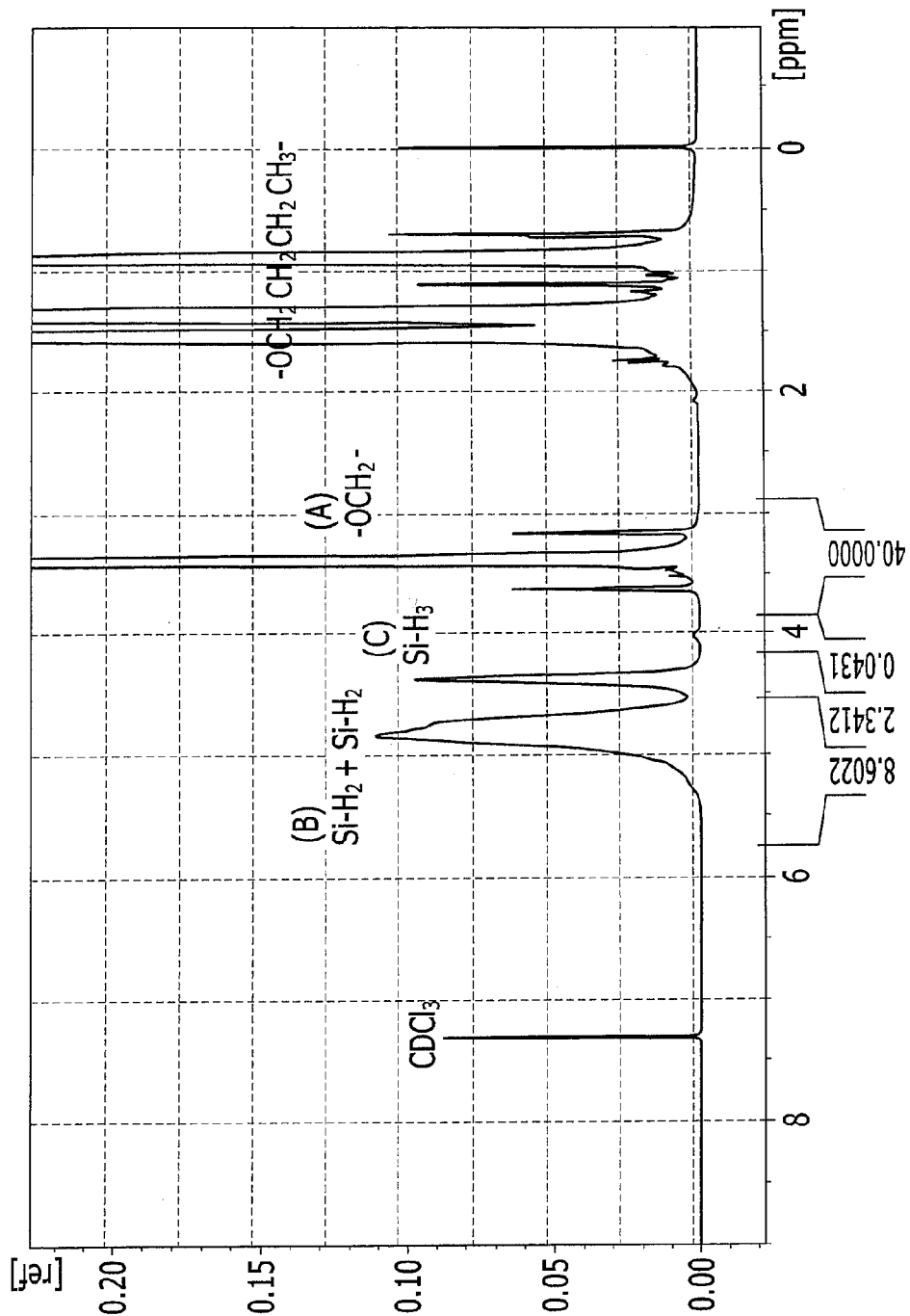

COMPOSITION FOR FORMING SILICA LAYER, METHOD FOR MANUFACTURING SILICA LAYER, AND SILICA LAYER

CROSS-REFERENCE TO RELATED APPLICATION

This application claims priority to and the benefit of Korean Patent Application No. 10-2015-0068120, filed in the Korean Intellectual Property Office on May 15, 2015, the entire content of which is incorporated herein by reference.

BACKGROUND

1. Field

This disclosure relates to a composition for forming a silica layer, a method for manufacturing a silica layer, and a silica layer manufactured according to the method.

2. Description of the Related Art

A flat panel display uses a thin film transistor (TFT) (including a gate electrode, a source electrode, a drain electrode, and a semiconductor) as a switching device, and is equipped with a gate line transferring a scan signal for controlling the thin film transistor and a data line transferring a signal applied to a pixel electrode. In addition, an insulation layer is formed between the semiconductor and the several electrodes to separate them.

The insulation layer may be formed by using a silicon-containing composition. Herein, the insulation layer may generate a large amount of out-gas during the manufacturing process and thus causing a defect, and this defect may have an unsatisfactory influence on a yield and reliability of a device manufactured with the insulation layer.

SUMMARY

An aspect of an embodiment is directed toward a composition for forming a silica layer capable of reducing or minimizing the amount of out-gas of the layer.

An aspect of an embodiment is directed toward a method of manufacturing a silica layer utilizing the composition for forming a silica layer.

Yet another aspect of an embodiment is directed toward a silica layer manufactured according to the method.

Still another aspect of an embodiment is directed toward an electronic device including the silica layer.

According to one embodiment, a composition for forming a silica layer including a silicon-containing polymer and a solvent, and having a total sum of the Si—H integral values of the silicon-containing polymer in the 1H-NMR spectrum of less than or equal to about 12 is provided.

The total sum of the Si—H integral values is obtained sequentially through the following acts S1 and S2 under Condition 1.

[Condition 1]

S1) a Sample 1 having a solid content of about 15±0.1 wt % is prepared by adding a silicon-containing polymer to dibutylether (DBE) and subsequently diluting it by 20% with a CDCl$_3$ (Chloroform-d) solvent, thereby preparing a Sample 2.

S2) 1H-NMR spectrum of the Sample 2 is measured at 300 MHz to calculate a sum of the integral values of Si—H1, Si—H2, and Si—H3 according to the following method, this calculation is repeated three times, and then three sums obtained therefrom are arithmetically averaged to obtain a total sum of the Si—H integral values.

(A Method of Calculating a Sum of the Integral Values of Si—H1, Si—H2, and Si—H3)

Assuming that the dibutylether has an integral value of 40, each integral value of a peak (peak B) corresponding to the Si—H1 and Si—H2 present in the silicon-containing polymer and a peak (peak C) corresponding to the Si—H3 is respectively calculated. Then, the peaks B and C are summed, and the sum is regarded as the sum of the integral values of the Si—H1, Si—H2, and Si—H3.

The sum of the Si—H integral values may be in a range of about 5 to about 12.

Specifically, the sum of the Si—H integral values may be in a range of about 8 to about 11.5.

The silicon-containing polymer may be polysilazane, polysiloxazane, or a combination thereof.

The solvent may include at least one selected from benzene, toluene, xylene, ethylbenzene, diethylbenzene, trimethylbenzene, triethylbenzene, cyclohexane, cyclohexene, decahydro naphthalene, dipentene, pentane, hexane, heptane, octane, nonane, decane, ethylcyclohexane, methylcyclohexane, cyclohexane, p-menthane, dipropylether, dibutylether, anisole, butyl acetate, amyl acetate, methyl isobutyl ketone, and a combination thereof.

The silicon-containing polymer may include a moiety represented by Chemical Formula 1.

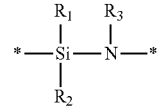

Chemical Formula 1

In Chemical Formula 1, R1 to R3 are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and "*" indicates a linking point.

The silicon-containing polymer may further include a moiety represented by Chemical Formula 2.

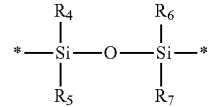

Chemical Formula 2

The R4 to R7 of Chemical Formula 2 are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and "*" indicates a linking point.

The silicon-containing polymer may be included in an amount of about 0.1 to about 30 wt % based on the total amount of the composition for forming a silica layer.

According to one embodiment, a method of manufacturing a silica layer is provided, and includes applying the composition for forming a silica layer on a substrate, drying the substrate applied with the composition for forming a silica layer to produce a resultant, and curing the resultant under an atmosphere including an inert gas at (with) a temperature of about 150° C. or more to manufacture a silica layer.

The composition for forming a silica layer may be coated utilizing a spin-coating method.

According to yet another embodiment, a silica layer manufactured utilizing the composition is provided.

According to still another embodiment, an electronic device including the silica layer is provided.

According to some embodiments, a composition for forming a silica layer capable of reducing the amount of out-gas generated during the curing is provided, thereby realizing a silica layer having a reduced or minimum defect.

BRIEF DESCRIPTION OF THE DRAWING

The drawing is for illustrating a method of calculating the sum of integral values of Si—H1, Si—H2, and Si—H3 in Example 1.

DETAILED DESCRIPTION

Exemplary embodiments of the present invention will hereinafter be described in more detail, and may be easily performed by those who have common knowledge in the related art. However, this disclosure may be embodied in many different forms, and is not construed as limited to the exemplary embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening element(s) may also be present. In contrast, when an element is referred to as being "directly on" another element, there are no intervening elements present.

As used herein, when a definition is not otherwise provided, the term 'substituted' may refer to one substituted with (other than by hydrogen) a substituent (on a compound) selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, an alkyl group, a C2 to C16 alkenyl group, a C2 to C16 alkynyl group, an aryl group, a C7 to C13 arylalkyl group, a C1 to C4 oxyalkyl group, a C1 to C20 heteroalkyl group, a C3 to C20 heteroarylalkyl group, a cycloalkyl group, a C3 to C15 cycloalkenyl group, a C6 to C15 cycloalkynyl group, a heterocycloalkyl group, and a combination thereof.

As used herein, when a definition is not otherwise provided, the term 'hetero' refers to one including 1 to 3 heteroatoms selected from N, O, S, and P.

As used herein, when a definition is not otherwise provided, '*' indicates a linking point of the same or different atom or chemical formula.

Hereinafter, a composition for forming a silica layer according to one embodiment is described.

The composition for forming a silica layer according to one embodiment includes a silicon-containing polymer and a solvent.

The silicon-containing polymer is a polymer including silicon (Si) in the structure, and may be, for example polysilazane, polysiloxazane, or a combination thereof.

In one embodiment of the present invention, the silicon-containing polymer has a set or predetermined Si—H integral value in a 1H-NMR spectrum. Specifically, the silicon-containing polymer has a total sum of the Si—H integral values in the 1H-NMR spectrum of less than or equal to about 12, and herein, the total sum of the Si—H integral values is the sum of the integral values of Si—H1, Si—H2, and Si—H3 obtained through the 1H-NMR spectrum.

In other words, the integral value of the Si—H1 is a peak area originated from the Si—H1, the integral value of the Si—H2 is a peak area originated from the Si—H2, the integral value of the Si—H3 is a peak area originated from the Si—H3, and the total sum of the Si—H integral values is a total sum of these peak areas.

The total sum of the Si—H integral values is obtained through the acts S1 and S2 provided in Condition 1.

[Condition 1]

S1) a Sample 1 having a solid content of about 15±0.1 wt % is prepared by adding a silicon-containing polymer to a dibutylether (DBE) solvent and subsequently diluting it by 20% with a $CDCl_3$ (Chloroform-d) solvent, thereby preparing a Sample 2.

S20 the 1H-NMR spectrum of the Sample 2 is measured at 300 MHz to calculate a sum of the integral values of Si—H1, Si—H2, and Si—H3 according to the following method, this calculation is repeated three times, and these three measurements are arithmetically averaged to obtain a total sum of the Si—H integral values.

(A Method of Calculating the Integral Values of Si—H1, Si—H2, and Si—H3)

Assuming that the dibutylether has an integral value of 40, each integral value of a peak (a peak B) corresponding to Si—H1 and Si—H2 present in the silicon-containing polymer and a peak (a peak C) corresponding to Si—H3 are respectively calculated. Then, the peaks B and C are summed, and the sum is regarded as a sum of the integral values of the Si—H1, Si—H2, and Si—H3.

Herein, the solid content is measured in the following method.

(A Method of Measuring a Solid)

One gram of the sample is put on an aluminum dish and baked on a hot plate at a temperature of about 160° C. for 20 minutes, and then the weight of the sample before and after the baking is measured.

*A solid content=(sample weight after baking–
weight of aluminum)/(sample weight before
baking)

The composition for forming a silica layer limitedly has a total sum of the integral values of Si—H1, Si—H2, and Si—H3 in a 1H-NMR spectrum within a set or predetermined range and thus may reduce or minimize generation of a defect of a layer formed of the composition for forming a silica layer.

In general, as a silicon-containing polymer such as polysilazane or polysiloxazane is manufactured to have a higher molecular weight, Si—H1, Si—H2, and Si—H3 at the end are removed to become H2, thereby producing a Si—N bond. Accordingly, when this silicon-containing polymer is used as an electron material for a semiconductor, for example, a filler material for gap filling, the Si—H remaining during curing or a post process is converted into H2, and thus a defect such as a hole and the like may not only be generated, but moisture may also be permeated thereinto.

According to one embodiment, a composition for forming a silica layer is controlled to have the sum of the integral values of the Si—H1, Si—H2, and Si—H3 in a 1H-NMR spectrum of less than or equal to about 12 and thus may reduce generation of out-gas such as H2. Accordingly, generation of a defect is reduced or minimized during curing, and thus a silica layer having high quality is realized.

The total sum of the Si—H integral values may be in a range of about 5 to about 12, for example, in a range of about 8 to about 11.5, but is not limited thereto.

On the other hand, the silicon-containing polymer included in the composition for forming a silica layer may include polysilazane including a moiety represented by Chemical Formula 1.

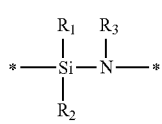

Chemical Formula 1

In Chemical Formula 1, R1 to R3 are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and "*" indicates a linking point.

The polysilazane may be manufactured in various methods, for example, in a method of reacting halosilane and ammonia.

Also, the silicon-containing polymer of the composition for forming a silica layer may include polysilazane including a moiety represented by Chemical Formula 2 in addition to or in the alternative to the moiety represented by Chemical Formula 1.

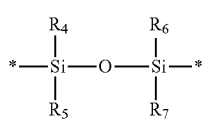

Chemical Formula 2

R4 to R7 of Chemical Formula 2 are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and "*" indicates a linking point.

In this way, when the composition includes the moiety of Chemical Formula 2, the hydrogenated polysiloxazane according to the embodiment structurally includes a silicon-oxygen-silicon (Si—O—Si) bonding moiety other than a silicon-nitrogen (Si—N) bonding moiety, and thus the silicon-oxygen-silicon (Si—O—Si) bonding moiety may relieve stress and reduce contraction during a curing process by a heat treatment.

Furthermore, the polysilazane or polysiloxazane included in the composition for forming a silica layer may include a moiety represented by Chemical Formula 3 at the end.

 Chemical Formula 3

The moiety represented by Chemical Formula 3 is end-capped with (is a structure where the terminal end is capped with) hydrogen, and may be included in an amount of about 15 to about 35 wt % based on the total amount of the Si—H bonding in the polysilazane or polysiloxazane structure. When the moiety represented by the above Chemical Formula 3 is included within the range in the polysilazane or polysiloxazane structure, the SiH3 moiety becomes SiH4, while an oxidation reaction sufficiently occurs during a heat treatment, and thus the composition for forming a silica layer may be prevented from scattering and thus contracting, and resultantly prevented from generating a crack.

The silicon-containing polymer may be included in an amount of about 0.1 to about 50 wt %, for example, about 0.1 to about 30 wt %, based on the total amount of the composition for forming a silica layer. When the silicon-containing polymer is included within the range, the composition for forming a silica layer may maintain appropriate viscosity and thus form a flat and even layer without a void.

The solvent of the composition for forming a silica layer may be any solvent having suitable dissolubility for the silicon-containing polymer without limitation, and may specifically be at least one selected from benzene, toluene, xylene, ethylbenzene, diethylbenzene, trimethylbenzene, triethylbenzene, cyclohexane, cyclohexene, decahydro naphthalene, dipentene, pentane, hexane, heptane, octane, nonane, decane, ethylcyclohexane, methylcyclohexane, cyclohexane, cyclohexene, p-menthane, dipropylether, dibutylether, anisole, butyl acetate, amyl acetate, methylisobutylketone, and a combination thereof.

The composition for forming a silica layer may further include a thermal acid generator (TAG).

The thermal acid generator may be an additive to improve a developing property of the composition for forming a silica layer (e.g., to improve a developing property of the polysilazane or polysiloxazane to be developed at a relatively low temperature).

The thermal acid generator may include any compound without particular limit, if it generates acid (H+) by heat. In particular, it may include a compound activated at a temperature of 90° C. or higher and generating sufficient acid and also having low volatility.

The thermal acid generator may be, for example, selected from nitrobenzyltosylate, nitrobenzyl benzene sulfonate, phenol sulfonate, and a combination thereof.

The thermal acid generator may be included in an amount of about 0.01 to about 25 wt % based on the total amount of the composition for forming a silica layer. Within the range, coating properties may be improved.

The composition for forming a silica layer may further include a surfactant.

The surfactant is not particularly limited, and may be, for example, a non-ionic surfactant such as polyoxyethylene alkyl ethers (such as polyoxyethylene lauryl ether, polyoxyethylene stearyl ether, polyoxyethylene cetyl ether, polyoxyethylene oleyl ether, and/or the like), polyoxyethylene alkylallyl ethers (such as polyoxyethylenenonyl phenol ether, and/or the like), polyoxyethylene.polyoxypropylene block copolymers, polyoxyethylene sorbitan fatty acid esters (such as sorbitan monolaurate, sorbitan monopalmitate, sorbitan monostearate, sorbitan monooleate, polyoxyethylene sorbitan monostearate, polyoxyethylene sorbitan trioleate, polyoxyethylene sorbitan tristearate, and/or the like); a fluorine-based surfactant of EFTOP EF301, EF303, EF352 (Tochem Products Co., Ltd.), MEGAFACE F171, F173 (Dainippon Ink & Chem., Inc.), FLUORAD FC430, FC431 (Sumitomo 3M), Asahi guardAG710, Surflon S-382, SC101, SC102, SC103, SC104, SC105, SC106 (Asahi Glass Co., Ltd.), and/or the like; and/or other silicone-based surfactants (such as a organosiloxane polymer KP341 (Shin-Etsu Chemical Co., Ltd.), and/or the like).

The surfactant may be included in an amount of about 0.001 to about 10 wt % based on the total amount of the composition for forming a silica layer. Within the range, dispersion of a solution and simultaneously uniform thickness of a layer may be improved.

The composition for forming a silica layer may be a solution obtained by dissolving the silicon-containing polymer and the components in a solvent.

According to another embodiment of the present invention, a method for manufacturing a silica layer includes: coating the composition for forming a silica layer on the substrate; drying the substrate coated with the composition for forming a silica layer to produce a resultant; and curing the resultant under an inert gas atmosphere at (with) a temperature of greater than or equal to about 150° C.

The composition for forming a silica layer may be coated utilizing a solution coating (application) process such as spin-coating, slit coating, and/or inkjet printing.

The substrate may be, for example, a device substrate such as a semiconductor, a liquid crystal, and the like, but is not limited thereto.

According to another embodiment of the present invention, a silica layer manufactured according to the method is provided. The silica layer may be, for example, an insulation layer, a separation membrane, or a hard coating layer, but is not limited thereto.

According to another embodiment of the present invention, an electronic device including the silica layer manufactured according to the method is provided. The electronic device may be, for example, a display device such as an LCD or LED, or a semiconductor device.

Hereinafter, the present disclosure is illustrated in more detail with reference to examples. However, these embodiments are exemplary, and the present disclosure is not limited thereto.

Preparation of Silicon-Containing Polymer

Comparative Example 1

Dry nitrogen was substituted inside a 2 L reactor equipped with an agitator and a temperature controller. Next, 1500 g of dry pyridine was added thereto, and the mixture was sufficiently mixed, put in a reactor, and kept warm at a temperature of 20° C. Subsequently, 100 g of dichlorosilane was slowly injected thereinto over one hour. Then, 70 g of ammonia was slowly injected thereinto over 3 hours, while the mixture was agitated. Subsequently, dry nitrogen was injected thereinto over 30 minutes, and the ammonia remaining in the reactor was removed. The obtained white slurry product was filtered with a 1 μm teflonpolytetrafluoroethylene (Teflon) filter under a dry nitrogen atmosphere, thereby obtaining 1000 g of a filtered solution. Then, 1000 g of dry xylene was added thereto, the solvent of the mixture was repeatedly substituted from the pyridine to xylene for three times in total by using a rotary evaporator (rotavap/rotovap) to adjust its solid concentration to 20%, and a product therefrom was filtered with a teflonpolytetrafluoroethylene (Teflon) filter having a pore size of 0.03 μm.

Through the process, polysilazane having a weight average molecular weight of 3000 was obtained, and herein, the weight average molecular weight was measured by using GPC made by Waters Co. (PLC Pump 1515, RI Detector 2414).

Example 1

Polysilazane having a weight average molecular weight of 5000 was obtained by injecting pyridine in a weight ratio of 200% relative to xylene to the xylene-phased composition synthesized according to Comparative Example 1, increasing a molecular weight while the mixture was agitated at a temperature of 100° C. for 3 hours, adding dry xylene thereto again, and then performing the same as Comparative Example 1.

Example 2

Polysilazane having a weight average molecular weight of 23,000 was obtained by injecting pyridine in a weight ratio of 200% relative to xylene to the xylene-phased composition synthesized according to Comparative Example 1, increasing a molecular weight while the mixture was agitated at a temperature of 100° C. for 60 hours, adding dry xylene thereto again, and then performing the same as Comparative Example 1.

Example 3

Polysilazane having a weight average molecular weight of 61,000 was obtained by injecting pyridine in a weight ratio of 200% relative to xylene to the xylene-phased composition synthesized according to Comparative Example 1, increasing a molecular weight while the mixture was agitated at a temperature of 100° C. for 100 hours, adding dry xylene thereto again, and then performing the same as Comparative Example 1.

Example 4

Polysilazane having a weight average molecular weight of 100,000 was obtained by injecting pyridine in a weight ratio of 200% relative to xylene to the xylene-phased composition synthesized according to Comparative Example 1, increasing a molecular weight while the mixture was agitated at a temperature of 100° C. for 120 hours, adding dry xylene thereto again, and then performing the same as Comparative Example 1.

Example 5

Polysilazane having a weight average molecular weight of 160,000 was obtained by injecting pyridine in a weight ratio of 200% relative to xylene to the xylene-phased composition synthesized according to Comparative Example 1, increasing a molecular weight while the mixture was agitated at a temperature of 100° C. for 150 hours, adding dry xylene thereto again, and then performing the same as Comparative Example 1.

Evaluation 1: Si—H Integral Value Sum of Silicon-Containing Polymer in 1H-NMR Spectrum The silicon-containing polymers according to Comparative Example 1 and Examples 1 to 5 were each respectively added to dibutylether (DBE), thereby preparing a Sample 1 having a solid content 15±0.1 wt % for each of the examples, and subsequently, the Sample 1 was diluted with a CDCl$_3$ solvent by 20%, thereby preparing a Sample 2.

Subsequently, 1H-NMR spectrum of the Sample 2 was measured at 300 MHz, thereby obtaining an integral value sum of Si—H1, Si—H2, and Si—H3. A method of specifically measuring the Si—H1, Si—H2, and Si—H3 is illustrated referring to the drawing.

The drawing shows NMR data of the Sample 2 according to the process by using the silicon-containing polymer of Example 1.

Referring to FIG. 1, the integral values of a peak (peak B) corresponding to the Si—H1 and Si—H2 and a peak (peak C) corresponding to the Si—H3 present in the silicon-containing polymer were respectively calculated and provided that integral value of dibutylether (DBE) is 40 (i.e., correspond to peak A in FIG. 1). Then, the sum of the peaks B and C was calculated as the integral value sum of the Si—H1, Si—H2, and Si—H3.

The measurement and calculation processes were repeated three times, the three measurements were averaged, and this average was regarded as a total sum of the Si—H integral values.

The results are provided in Table 1.

TABLE 1

| | Measurement Nos. | Total sum of integral values of Si—H$_1$ and Si—H$_2$ | Integral value of Si—H$_3$ | Total sum of integral values of Si—H$_1$, Si—H$_2$, and Si—H$_3$ | Integral value of Si—H (Avg) |
|---|---|---|---|---|---|
| Comparative Example 1 | 1 | 9.8133 | 2.8289 | 12.6422 | 12.64 |
| | 2 | 9.8056 | 2.8345 | 12.6401 | |
| | 3 | 9.8123 | 2.8300 | 12.6423 | |
| Example 1 | 1 | 8.5080 | 2.3078 | 10.8158 | 10.83 |
| | 2 | 8.5070 | 2.3255 | 10.8325 | |
| | 3 | 8.5376 | 2.3183 | 10.8559 | |
| Example 2 | 1 | 8.1167 | 2.3465 | 10.4633 | 10.47 |
| | 2 | 8.1213 | 2.3501 | 10.4714 | |

TABLE 1-continued

| | Measurement Nos. | Total sum of integral values of Si—H$_1$ and Si—H$_2$ | Integral value of Si—H$_3$ | Total sum of integral values of Si—H$_1$, Si—H$_2$, and Si—H$_3$ | Integral value of Si—H (Avg) |
|---|---|---|---|---|---|
| | 3 | 8.1188 | 2.3478 | 10.4666 | |
| Example 3 | 1 | 7.8466 | 2.2286 | 10.0752 | 10.06 |
| | 2 | 7.8247 | 2.2100 | 10.0347 | |
| | 3 | 7.8289 | 2.2313 | 10.0602 | |
| Example 4 | 1 | 7.2213 | 2.1567 | 9.3780 | 9.33 |
| | 2 | 7.1593 | 2.1422 | 9.3015 | |
| | 3 | 7.1750 | 2.1432 | 9.3182 | |
| Example 5 | 1 | 6.5143 | 1.7354 | 8.2497 | 8.25 |
| | 2 | 6.5011 | 1.7144 | 8.2155 | |
| | 3 | 6.5301 | 1.7397 | 8.2698 | |

When their 1H-NMR spectra were measured and referring to Table 1, the silicon-containing polymers according to Examples 1 to 5 all had a total sum of Si—H integral values of less than or equal to 12 unlike the silicon polymer according to Comparative Example 1.

Evaluation 2: Out-Gas Generation Evaluation

The silicon-containing polymers according to Comparative Example 1 and Examples 1 to 5 were respectively added to dibutylether (DBE) to prepare each solution sample including a solid of 2 wt %, the sample was respectively coated to be about 500 Å thick on two sheets of 4-inch wafers, and the total amount of out-gas generated therefrom was measured at about 150° C. for 600 seconds without pre-baking by using QCM (quartz crystal microbalance).

The results are provided in Table 2.

TABLE 2

| | | Comparative Example 1 | Example 1 | Example 2 | Example 3 | Example 4 | Example 5 |
|---|---|---|---|---|---|---|---|
| Wafer 1 | Coating thickness (Å) | 495 | 494 | 496 | 502 | 500 | 501 |
| | Amount of out-gas (ng) | 9645 | 6366 | 4691 | 3254 | 1592 | 1199 |
| Wafer 2 | Coating thickness (Å) | 500 | 498 | 500 | 498 | 501 | 497 |
| | Amount of out-gas (ng) | 6231 | 3765 | 3215 | 2390 | 1199 | 1050 |

Referring to Table 2, silica layers formed of the compositions for forming a silica layer including a silicon-containing polymer according to Examples 1 to 5 showed relatively very low amounts of out-gas compared with one formed of the composition for forming a silica layer according to Comparative Example 1.

As used herein, the term "and/or" includes any and all combinations of one or more of the associated listed items. Expressions such as "at least one of" or "at least one selected from" when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration. As used herein, the terms "use," "using," and "used"

may be considered synonymous with the terms "utilize," "utilizing," and "utilized," respectively.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the term "substantially," "about," and similar terms are used as terms of approximation and not as terms of degree, and are intended to account for the inherent deviations in measured or calculated values that would be recognized by those of ordinary skill in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A composition for forming a silica layer, the composition comprising
a silicon-containing polymer including a SiH$_3$ moiety, and a solvent,
wherein the silicon-containing polymer has a total sum of Si—H integral values in a $^1$H-NMR spectrum of less than or equal to about 12,
the total sum of Si—H integral values is calculated through the following acts S1 and S2 provided in Condition 1:
[Condition 1]
S1) a Sample 1 having a solid content of about 15±0.1 wt % is prepared by adding the silicon-containing polymer to dibutylether (DBE) and then diluting it by 20% by volume with a CDCl$_3$ (Chloroform-d) solvent, thereby preparing a Sample 2, and
S2) $^1$H-NMR spectrum of the Sample 2 is measured at 300 MHz to calculate integral values of Si—H$_1$, Si—H$_2$, and Si—H$_3$ according to the following method, the calculation is repeated three times, these three measurements are averaged, and this average is regarded as a total sum of the Si—H integral values,
wherein a method of calculating the sum of the integral values of the Si—H$_1$, Si—H$_2$, and Si—H$_3$ is as follows:
assuming that the dibutylether has an integral value of 40, integral values of a peak (peak B) corresponding to Si—H$_1$ and Si—H$_2$ present in the silicon-containing polymer and a peak (peak C) corresponding to Si—H$_3$ are respectively calculated, and
the peaks B and C are summed, and the sum is regarded as the sum of the integral values of Si—H$_1$, Si—H$_2$, and Si—H$_3$; and
the SiH$_3$ moiety is included in an amount of about 15 to about 35 wt % based on a total amount of Si—H.

2. The composition of claim 1, wherein the total sum of the Si—H integral values is in a range of about 5 to about 12.

3. The composition of claim 2, wherein the total sum of the Si—H integral values is in a range of about 8 to about 11.5.

4. The composition of claim 1, wherein the silicon-containing polymer comprises polysilazane, polysiloxazane, or a combination thereof.

5. The composition of claim 1, wherein the solvent comprises at least one selected from benzene, toluene, xylene, ethylbenzene, diethylbenzene, trimethylbenzene, triethylbenzene, cyclohexane, cyclohexene, decahydro naphthalene, dipentene, pentane, hexane, heptane, octane, nonane, decane, ethylcyclohexane, methylcyclohexane, cyclohexene, p-menthane, dipropylether, dibutylether (DBE), anisole, butyl acetate, amyl acetate, methyl isobutyl ketone, and a combination thereof.

6. The composition of claim 1, wherein the silicon-containing polymer comprises a moiety represented by Chemical Formula 1:

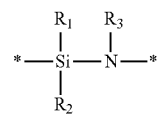

Chemical Formula 1 wherein, in Chemical Formula 1, R$_1$ to R$_3$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and
"*" indicates a linking point.

7. The composition of claim 6, wherein the silicon-containing polymer further comprises a moiety represented by Chemical Formula 2:

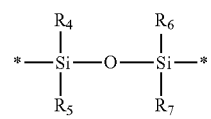

Chemical Formula 2

R$_4$ to R$_7$ of Chemical Formula 2 are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and
"*" indicates a linking point.

8. The composition of claim 1, wherein the silicon-containing polymer is included in an amount of about 0.1 to about 30 wt % based on the total amount of the composition for forming a silica layer.

9. A method for manufacturing a silica layer, the method comprising:
   coating the composition of claim 1 on a substrate;
   drying the substrate coated with the composition to produce a resultant; and
   curing the resultant under an inert atmosphere at a temperature of greater than or equal to about 150° C. to manufacture a silica layer.

10. The method of claim 9, wherein the composition for forming a silica layer is coated utilizing a spin-coating method.

11. The method of claim 9, wherein the total sum of the Si—H integral values is in a range of about 5 to about 12.

12. The method of claim 11, wherein the total sum of the Si—H integral values is in a range of about 8 to about 11.5.

13. The method of claim 9, wherein the silicon-containing polymer comprises polysilazane, polysiloxazane, or a combination thereof.

14. The method of claim 9, wherein the solvent comprises at least one selected from benzene, toluene, xylene, ethylbenzene, diethylbenzene, trimethylbenzene, triethylbenzene, cyclohexane, cyclohexene, decahydro naphthalene, dipentene, pentane, hexane, heptane, octane, nonane, decane, ethylcyclohexane, methylcyclohexane, cyclohexene, p-menthane, dipropylether, dibutylether, anisole, butyl acetate, amyl acetate, methyl isobutyl ketone, and a combination thereof.

15. The method of claim 9, wherein the silicon-containing polymer comprises a moiety represented by Chemical Formula 1:

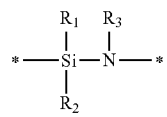

Chemical Formula 1 wherein, in Chemical Formula 1, $R_1$ to $R_3$ are each independently hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a substituted or unsubstituted C2 to C30 alkenyl group, a substituted or unsubstituted alkoxy group, a carboxyl group, an aldehyde group, a hydroxy group, or a combination thereof, and "*" indicates a linking point.

16. A silica layer manufactured according to the method of claim 9.

17. An electronic device comprising a silica layer, the silica layer being a derivation of the composition of claim 1.

* * * * *